INVENTOR,
Glenn G. Strickland

BY: Harry M. Saragovitz,
Edward J. Kelly &
R. P. Gibson
ATTORNEYS

United States Patent Office 3,535,528
Patented Oct. 20, 1970

3,535,528
RADIATION SENSITIVE PASSIVE BINOCULAR MOTION DETECTOR
Glenn G. Strickland, 5715 Marie Tobin,
El Paso, Tex. 79924
Filed June 11, 1968, Ser. No. 736,129
Int. Cl. H01j *39/12;* G08b *21/00*
U.S. Cl. 250—210                                    3 Claims

ABSTRACT OF THE DISCLOSURE

A passive binocular motion detector using ambient radiation for viewing wherein spaced radiation sensitive means employed in the arms of a balanced bridge circuit are responsive to disturbances in the ambient radiation field caused by an object passing therethrough within the field of view of the motion detector to cause imbalancing of the bridge whereby a signal is produced at the output thereof.

---

The invention described herein may be manufactured, used and licensed by or for the Government of the United States of America for governmental purposes without the payment to me of any royalty thereon.

The invention relates to motion detectors for detection of moving objects in ambient radition and more particularly to a passive, binocular motion detector utilizing ambient radiation for viewing and which is nonresponsive to distant background radation or radiation caused by nearby stationary objects, but will produce an indicating signal when the motion of a nearby object creates a change in the ambient radiation pattern. With minor variations, the inventive device can be used as a burglar alarm, a jungle warfare warning system, a proximity switch, a limited substitute for radar in small aircraft as well as a tracking means.

According, it is a prime object of the invention to provide a passive binocular motion detector that is nonresponsive to overall changes in the ambient radiation level, but is responsive to produce a signal indicative of moton of an object which creates a change in the ambient radiation pattern.

Another object of the invention is a passive binocular device for detecting the direction of motion and the position of a moving object in the ambient radiation field.

Another object of the invention is a simple pilot warning device which may readily be installed in small aircraft whereby approach of intruding aircraft may be ascertained.

Figure 1:
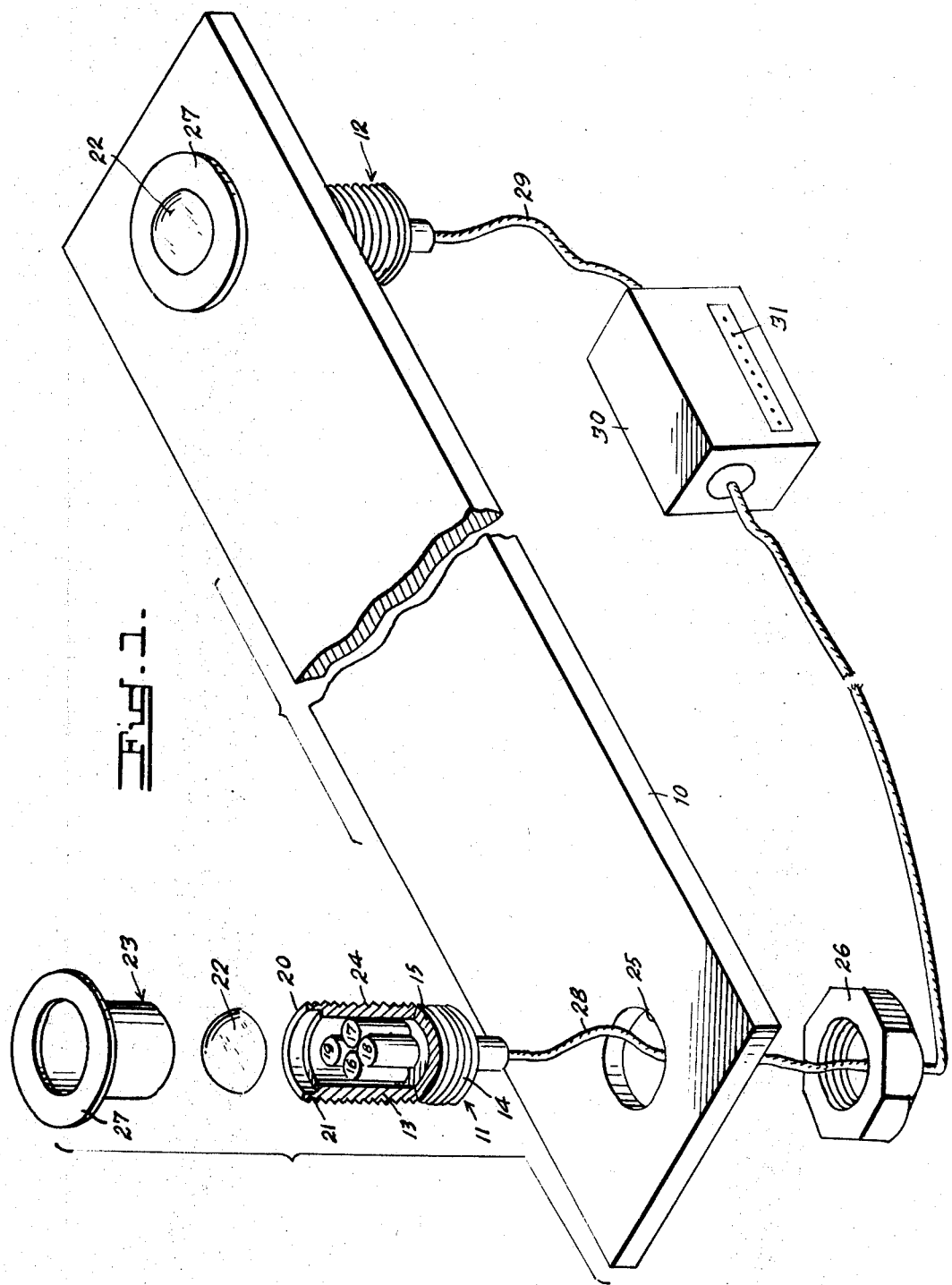
Figure 2:
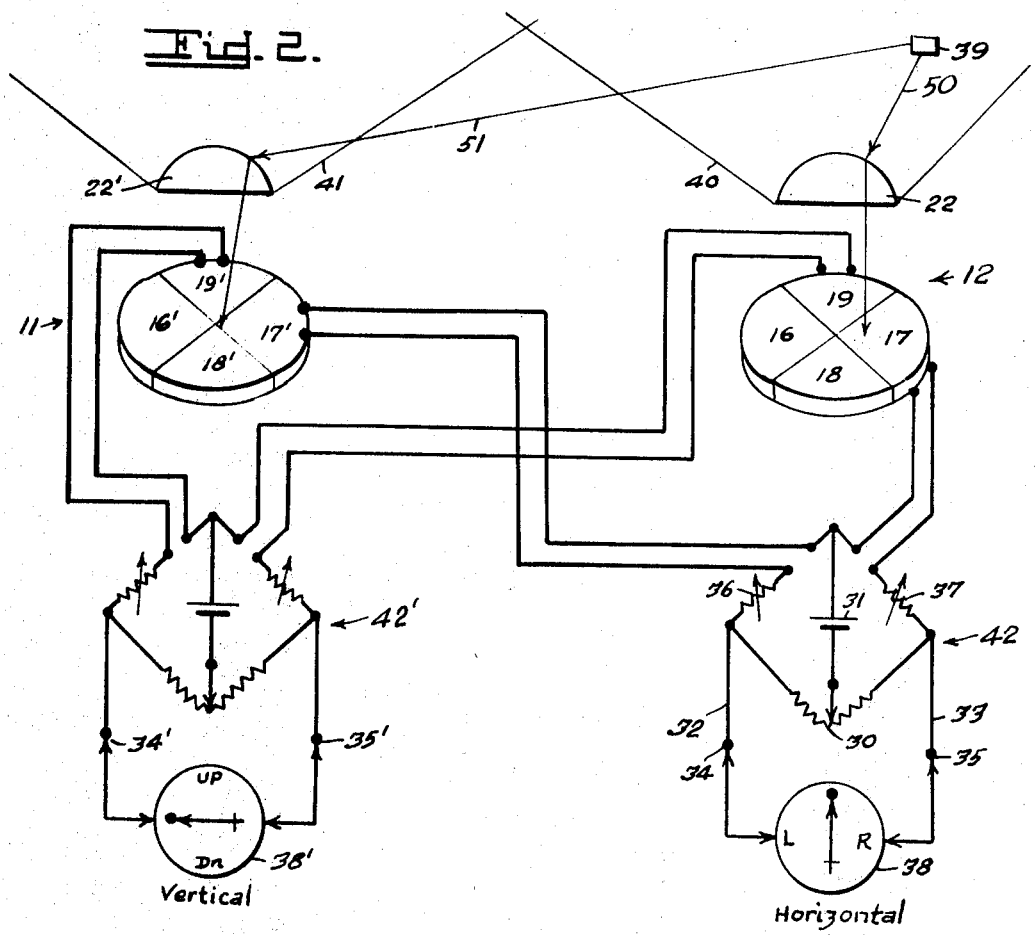
Figure 3:
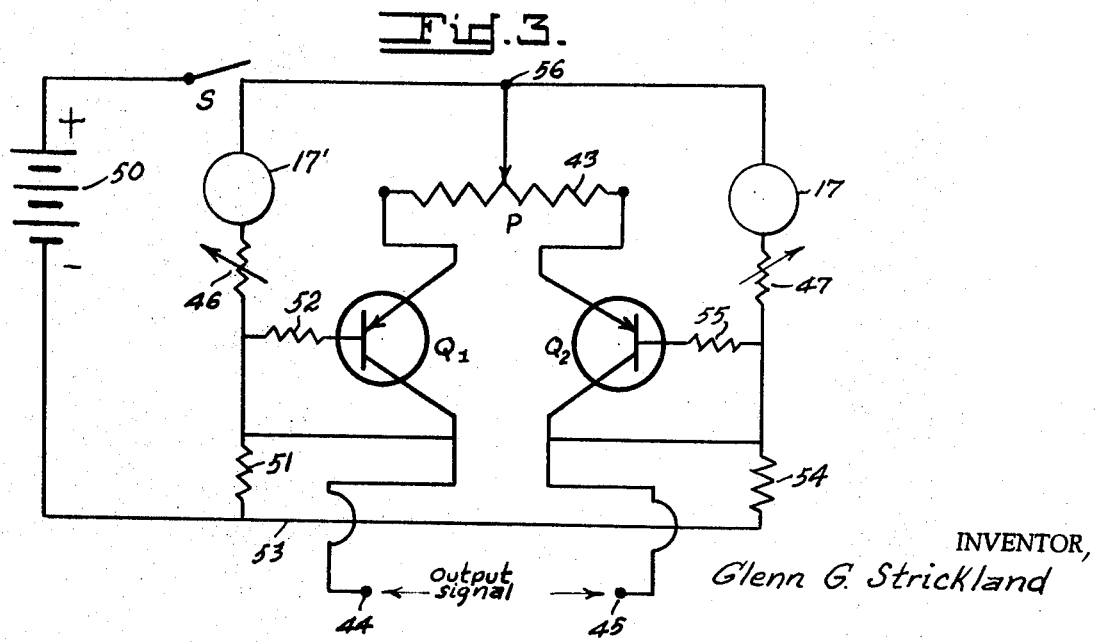

The invention will be more fully understood and its objects and advantages further appreciated by referring now to the detailed description taken in conjunction with the accompanying drawings in the several figures of which like numerals identify lke elements and in which:

FIG. 1 is an exploded perspective view illustrating an embodiment of the invention, FIG. 2 is a schematic elementary diagram of the invention, and FIG. 3 is a schematic diagram of a transistor balanced network which may be used in the invention.

Referring now to FIG. 1, reference numeral 10 indicates mounting means which may be, for example, a wall, dashboard or an appropriate part of a fuselage wherein is mounted two spaced identical radiation sensors 11 and 12. Each sensor consists of a hollow cylindrical housing 13 formed with a closed end 14 having a plurality of apertures 15 therein in which are affixed a grid of radiation sensitive means as indicated by reference numberals 16, 17, 18 and 19. In the embodiment shown, radiation sensitive means 16 and 17 are normally positioned to detect horizontal motion of an object in the ambient radiation field and radiation sensitive means 18 and 19 are employed to detect the vertical motion of the object. The open end 20 of housing 13 is formed with a recess 21 for supporting a lens system 22 in housing 20. Lens system 22 is retained in housing 20 by means of hollow cylindrical flanged lens retainer 23 which is internally threaded for engagement with the peripheral threads 24 formed on the exterior longitudinal surface of housing 13. The assembled sensor 11 is inserted in aperture 25 of the mounting means 10 and retained therein by means of nut 26 which is run up on threads 24 and fastens the sensor 11 therein between flange 27 and nut 26. Cables 28 and 29 couple the radiation sensitive means of sensors 11 and 12, respectively, into the arms of electronic or electrical bridge networks contained in housing 30 which is provided with terminal means 31 for coupling the output signals of the bridge networks to alerting means or logic circuitry.

FIG. 2 illustrates one application of the invention for detection of, for exampl,e a luminous object 39 moving in a path from right to left in the ambient radiation field and which may have some vertical motion while traversing the path. The radiation sensitive means 17 of sensor 12 comprises a first arm of a Wheatstone type of bridge 42, and radiation sensitive means 17' of sensor 11 a second arm thereof. Potentiometer 30 comprises the third and fourth arms of bridge 42 and may normally be used to balance the bridge currents. However, in the case of detecting the passage of a moving object traversing the overlaping cones of view 40 and 41 of lens systems 22 and 22' of spaced sensors 12 and 11 respectively, the potentiometer arm is adjusted to provide equal resistance in the third and fourth arms. A trim potentiometer 37 is connected in the first arm in series with radiation sensitive means 17 and a trim potentiometer 36 is connected in the second arm in series with radiaton sensitive means 17' to compensate for the fact that at present radiation sensitive means are only approximately equal in their responses to any given range of radiation intensities. A battery 31 for supplying current to the bridge 42 is connected across one diagonal of the bridge 42, that is, between the arm of potentiometer 30 and the junction formed by the radiation sensitive means 17' and 17. A simple indicating means utilizing the output signal of bridge 42 may comprise a zero-center milliammeter 38 connected to the terminals 34 and 35, coupled to the other diagonal of the bridge 42 by means of conductors 32 and 33, for indicating horizontal motion of the object in the ambient radiation field. Wheatstone type bridge 42', is identical to bridge 42, with exception that radiation sensitive means 19 and 19' of sensors 12 and 11, respectively, are physically positioned in the sensors for detecting vertical motion of the object comprise the first and second arms thereof, respectively, and has coupled to its output terminals 34' and 35' a zero-center milliammeter 38' oriented so that its pointer operates in a veritcal plane to facilitate the sensing of the direcion of the object's vertical motion by the observer. Although the schematic of FIG. 2 shows but the use of two pairs of radiation sensitive means, it is to be understood that any number of pairs of radiation sensitive means with their accompanying balanced electrcal networks and utilization devices may be employed. Further, although a luminous object has been included in the foregoing description, it is to be understood that any object moving in the ambient field within the cones of view will cause a distortion of the ambient radiation field which is sensed by one or more of the radiation sensing means causing the related Wheatstone type of bridge or any other type of balanced networks in which the radiation sensing means are included to become imbalanced producing signals at the outputs thereof which may be coupled to utilization means such as a burglar alarm system, a light tracking device or computer means.

In the practice of the invention, it is to be noted that light rays from a distant point in the ambient radiation are bent equally by the lens system of each sensor and the radiation sensitive means of each sensor and the radiation sensitive means of each sensor are therefore affected equally causing no imbalance of the balanced electrical networks. Moreover, changes in the level of ambient lighting would not create a response. However, light rays generated due to motion of a nearby object passing through the cones of view are not parallel, as indicated by reference numerals 50 and 51 with regard to object 39 in FIG. 2, affect the radiation responsive means unequally causing imbalance in the balanced network in which they are incorporated, for example, balanced network 42, whereby an output signal is produced at the output thereof. An object 39 moves in a substantially horizontal direction to the left creating changes in the ambient radiation pattern, lens system 22 of sensor 12 focuses most of the light radiation due to the distortion of the ambient radiation pattern on account of such movement onto radiation sensitive means 17 of sensor 12 causing bridge 42 to become imbalanced and the pointer of zero-center milliammeter 38 to deflect to the right indicating that the object is coming in from the right side. As object 39 continues on its path through cones of view 40 and 41 the light rays due to the distortion of the ambient radiation pattern by passage of the object as it passes through the midpoint area between sensors 12 and 11 are focused onto radiation sensitive means 16 and 17' of sensors 12 and 11, respectively, by their respective lens systems 22' and 22. Radiation sensitive means 17' subsequently receives most of the radiation due to distortion by motion of object 39 in the ambient radiation pattern and in response thereto causes another imbalance in bridge 42 resulting in the pointer of milliammeter 38 deflecting towards the left indicating the passage of object 39 through the aforementioned midpoint area on its way through the field of view 41. In the same manner, a zero-center milliammeter 38' coupled to the output of bridge 42' having radiation sensitive means 19 and 19' incorporated in the grids of sensors 12 and 11, respectively, and forming the first and second arms of bridge 42' will indicate vertical movement of object 39.

FIG. 3 is a schematic diagram of another balanced network which may be utilized in the invention wherein a battery 50 provides a source of D.C. supply voltage for the operation of transistors $Q_1$ and $Q_2$. A voltage divider consisting of series connected radiation sensitive means such as indicated by 17' of sensor 11 and resistor 51 is connected across battery 50 with its intermediate point coupled through base resistor 52 to the base electrode of transistor $Q_1$ for the purpose of providing the operating potential of the base of transistor $Q_1$. The collector electrode of transistor $QQ_1$ is connected to the top of resistor 51 whereby a collector operating potential is provided. The bottom terminal of resistor 51 is connected to common circuit 53. In the same manner and for the same purpose as described in conjunction with transistor $Q_1$, transistor $Q_2$ is provided with a base resistor 55, a source of D.C. supply voltage, battery 50, and an identical voltage divider identified in the drawings as series connected radiation sensitive means 17 of corresponding sensor 12 and resistor 54. Potentiometer 43 which is for the purpose of balancing the network has its resistance element coupling the emitter electrodes of transistors $Q_1$ and $Q_2$ and its movable arm connected to junction 56 formed by one terminal of battery 50 and the radiation sensitive means 17' and 17. If desired or found necessary, trim potentiometers 46 and 47 may be placed in series with radiation sensitive means 17' and 17, respectively, to compensate for any differences in response of the radiation sensitive means to radiation intensities. In operation, any disturbance of the ambient radiation field produced by an intruder in the cones of view is detected by the radiation sensitive means thereby causing an imbalance in the balanced transistor network, resulting in an output signal at the collector electrodes which are coupled to terminals 44 and 45 for utilization of the output signal as aforedescribed.

From the foregoing, it can be seen that the polarity of the output signal indicates which side of the area under observation receives most of the disturbing radiation. The magnitude of the output signal is a function of the difference of the intensity of the disturbing radiation on the spaced radiation sensitive means or cells and therefore, for each pair of spaced radiation sensitive means the source of the disturbance can be located on the surface of a hyperboloid of revolution. With data from sufficient number of pairs of spaced radiation sensitive means, the vector from the passive, binocular, motion detector of the invention to the disturbance can be computed. Thus, the passive binocular motion detector of the invention can function to give approximately the same data as a radar.

While a preferred form of the invention has been shown and described for the purpose of illustration, it will be understood that reasonable modifications may be made in the practice of the invention without departing from the spirit of the invention or scope of the following claims. For instance, two widely separated astronomical telescopes serving as lens means for grids comprising the radiation sensitive means may be served to point in parallel direction whereby moving points or objects at great distances in the ambient radiation field would be detected. Also, with the addition of self-balancing potentiometers, the device can be made to respond only to changes greater than any given amount.

Further, it is not intended that the instant invention be limited in use to visible radiation since, for example, with suitable lens systems and sensor grids it may be employed as an infrared intrusion detector.

I claim:

1. A passive binocular motion detector utilizing ambient radiation for viewing that ignores distant background, stationary objects and overall changes in the ambient radiation level, but develops a warning signal when a moving object in the field of view creates a change in the ambient radiation pattern comprising in combination, first and second radiation sensors spaced from each other and arranged in parallel alignment for surveillance of a space, radiation responsive means in each said sensor comprising a mosaic of radiation responsive means where in each mosaic some of the radiation responsive means are positioned therein for response to disturbance of the ambient radiation pattern by horizontal movement of an object passing therethrough and others of the radiation responsive means are positioned therein for response to the vertical component of the movement of said object, a balanced electrical network having included therein a radiation responsive means of each of said radiation sensors, optical means positoned in said sensors for focusing the rays created due to disturbance of the ambient radiation pattern by passage of an object therethrough onto at least one of said radiation responsive means whereby said balanced electrical network imbalances produce a warning signal at the output thereof, said first and second spaced radiation sensors each comprising a cylindrical member adapted to be affixed to mounting means, said cylindrical member provided with peripheral threads and having one closed end adapted to support said mosaic of radiation responsive means, the open end of the cylindrical member formed with an internal recess supporting the optical means therein, a flanged sleeve member provided with internal threads in engagement with the peripheral threads whereby the optical means is retained in the recess, conductor means extending from each radiation responsive means of each mosaic coupling pairs of radiation responsive means to respective balanced electric networks, each pair of radiation responsive means consisting of a radiation responsive means of the first radiation sensor and a radiation responsive means of the second radiation sensor.

2. The invention in accordance with claim 1 wherein each of said respective balanced electrical networks comprises a resistance element and a movable contact therefor capable of dividing the resistance element to form a pair of arms for a Wheatstone type bridge, a radiation responsive means of the first radiation sensor forming a third arm of said bridge, a radiation responsive means of the second radiation sensor forming a fourth arm of said bridge, a potential source connected across on diagonal of said bridge coupling the movable contact and the junction formed by the radiation responsive means of said third and fourth arms, intruder indicating means coupled across the other diagonal of said bridge which responds to an output signal generated in said bridge due to imbalance therein when an object passes through said ambient radiation pattern, and a trimming resistance in series with each said radiation responsive means for the purpose of compensating the inequality of response of said radiation responsive means to the ambient radiation.

3. The invention in accordance with claim 1 wherein each said respective balanced electrical networks comprises a first and second transistor balanced network, each said transistor having base, emitter and collector electrodes, a potentiometer for balancing the network having the resistance element thereof coupling the emitter electrodes, means for providing an operating potential for the base electrode of said first transistor comprising a voltage divider consisting of a radiation responsive means of the first radiation sensor in series with a resistor and having the intermediate point thereof coupled to the base electrode of said first transistor through a base resistor, means for providing an operating potential for the base electrode of said second transistor comprising a voltage divider consisting of a radiation responsive means of the second radiation sensor in series with a resistor and having the intermediate point thereof coupled to the base electrode of said second transistor through a base resistor, the terminal of each said resistor comprising one end of each said first and second voltage divider being connected to a common circuit, the terminal of each said radiation responsive means comprising another end terminal of each said first and second voltage divider being connected to the movable arm of said potentiometer, biasing means for each said collector electrode, output signal terminal means connected to each said collector electrode, and a source of D.C. supply voltage for operation of said transistors connected between said movable arm and said common circuit, said radiation responsive means responsive to disturbances of the ambient radiation field created by an intruder passing therethrough to cause imbalance in said balanced transistor network whereby output signals are produced at said output signal terminals.

References Cited

UNITED STATES PATENTS

| | | | |
|---|---|---|---|
| 2,774,961 | 12/1956 | Orlando | 250—210 X |
| 3,029,345 | 4/1962 | Douglas | 250—210 X |
| 3,191,048 | 6/1965 | Cowen | 250—221 |
| 3,333,105 | 7/1967 | Kossakowski et al. | 340—233 X |
| 3,396,279 | 8/1968 | Tokuda | 250—222 X |
| 2,432,671 | 3/1969 | Edmonds | 250—211 X |

WALTER STOLWEIN, Primary Examiner

U.S. Cl. X.R.

250—221; 340—233